(12) United States Patent
Song

(10) Patent No.: US 6,506,847 B1
(45) Date of Patent: Jan. 14, 2003

(54) CONTROLLING THE MOLECULAR WEIGHT OF GRAFT COPOLYMERS USING POLYMERIZABLE CHAIN TRANSFER AGENTS

(75) Inventor: Cheng Q. Song, Wilmington, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/924,253

(22) Filed: Aug. 8, 2001

(51) Int. Cl.[7] .......................... C08G 63/48; C08L 51/00; C08F 251/00
(52) U.S. Cl. ..................... 525/322; 525/48; 525/64; 525/258; 525/263; 525/301
(58) Field of Search ........................... 525/322, 48, 64, 525/258, 263, 301

(56) References Cited

U.S. PATENT DOCUMENTS

| | | | |
|---|---|---|---|
| 3,644,575 A | 2/1972 | Nakatsuka et al. | 260/876 R |
| 4,000,220 A | 12/1976 | Shoji et al. | 260/878 R |
| 4,001,349 A | 1/1977 | Severini et al. | 260/878 R |
| 4,208,490 A | 6/1980 | Kondo et al. | 525/243 |
| 4,308,354 A | 12/1981 | Jung et al. | 525/84 |
| 4,427,826 A | 1/1984 | Echte et al. | 525/53 |
| 5,140,074 A | 8/1992 | DeNicola, Jr. et al. | 525/263 |
| 5,212,246 A | 5/1993 | Ogale | 525/240 |
| 5,300,568 A * | 4/1994 | Abe et al. | |
| 5,302,454 A | 4/1994 | Cecchin et al. | 428/402 |
| 5,409,992 A | 4/1995 | Eppert, Jr. | 525/88 |
| 5,468,810 A | 11/1995 | Hayakawa et al. | 525/244 |
| 5,863,994 A | 1/1999 | DeNicola, Jr. et al. | 526/74 |

* cited by examiner

Primary Examiner—James J. Seidleck
Assistant Examiner—Olga Asinovsky

(57) ABSTRACT

The molecular weight of a graft copolymer is reduced by carrying out the following steps in a non-oxidizing atmosphere: (1) treating a propylene polymer material with an organic compound that is a free radical polymerization initiator, (2) treating the propylene polymer material with about 2 to about 240 parts per hundred parts of the propylene polymer material, of at least one vinyl-substituted grafting monomer in the presence of about 0.5% to about 5% of a polymerizable chain transfer agent that is a derivative of allyl alcohol, and (3) removing any unreacted monomer, decomposing any unreacted initiator, and deactivating any residual free radicals in the material.

12 Claims, No Drawings

CONTROLLING THE MOLECULAR WEIGHT OF GRAFT COPOLYMERS USING POLYMERIZABLE CHAIN TRANSFER AGENTS

FIELD OF THE INVENTION

This invention relates to a method for controlling the molecular weight of polyolefin graft copolymers.

BACKGROUND OF THE INVENTION

Polymer molecular weight and its distribution are critical parameters affecting the final properties of a graft copolymer. During free radical polymerization, the molecular weight of the polymer is mainly determined by the reaction temperature, the concentration of free radical initiators, and the monomer concentration.

In a gas mixed reactor, a lower polymerization temperature will usually reduce the gas phase fouling due to a lower monomer vapor pressure in the gas phase. The main issue associated with a lower reaction temperature is that graft copolymers prepared in this manner have an undesirably high molecular weight. Although increasing the initiator concentration will help to reduce the molecular weight, the molecular weight dependence on the initiator concentration is less pronounced due to the very low initiation efficiency observed for graft polymerization. In addition, graft copolymerization is carried out using a pure monomer feed and therefore the monomer concentration is not an adjustable parameter for polymer molecular weight control.

Using a chain transfer agent in free radical polymerization can reduce the polymer molecular weight by its chain-breaking action. This results in a decrease in the size of the propagating polymer chain. The effect of chain transfer on the polymerization rate is dependent on whether the rate of re-initiation is comparable to that of the original propagating radical. Organic compounds such as mercaptans or alkyl bromides have been widely used in polymerization processes to control polymer molecular weight. For example, U.S. Pat. No. 4,000,220 discloses the use of chain transfer agents such as mercaptans, thiopropionic acid, carbon tetrachloride, and dimeric alpha-methylstyrene in the production of thermoplastic graft copolymer resins. U.S. Pat. No. 4,001,349 discloses the use of chain transfer agents such as mercaptans for the preparation of grafted products of styrene and saturated polyolefinic elastomers. U.S. Pat. No. 4,308,354 discloses the manufacture of transparent, impact-resistant polymers from polybutadiene rubber and a mixture of methyl methacrylate, styrene, and methyl or ethyl acrylate by polymerizing in the presence of an initiator and a chain transfer agent such as an alkyl mercaptan. U.S. Pat. No. 4,427,826 discloses polymerizing 1,3-diene rubber and one or more vinyl monomers, with or without a solvent, in the absence of a free radical initiator and in the presence of a mercaptan chain transfer agent. The chain transfer agent often produces an undesirable odor or color in the final product. Removing chain transfer agent residue in the polymer could also be a difficult task.

There is therefore a need for a chain transfer agent that can effectively reduce polymer molecular weight without leaving an undesirable residue in the final product.

SUMMARY OF THE INVENTION

The process of this invention for reducing the molecular weight of graft copolymers comprises, in a substantially non-oxidizing atmosphere, (1) treating a propylene polymer material with an organic compound that is a free radical polymerization initiator, (2) treating the propylene polymer material over a period of time that coincides with or follows (1) with or without overlap, with about 2 to about 240 parts per hundred parts of the propylene polymer material, of at least one vinyl-substituted grafting monomer capable of being polymerized by free radicals, in the presence of about 0.5% to about 5%, based on the total weight of monomer, of a polymerizable chain transfer agent that is a derivative of allyl alcohol, and (3) removing any unreacted monomer from the resulting grafted propylene polymer material, decomposing any unreacted initiator, and deactivating any residual free radicals in the material.

Carrying out the graft polymerization reaction in the presence of an allyl alcohol derivative that is polymerizable by a free radical initiator effectively reduces the molecular weight of the graft copolymer. The concentration of chain transfer residue in the final product is low because the chain transfer agent is incorporated into the polymer chain.

DETAILED DESCRIPTION OF THE INVENTION

"Substantially non-oxidizing environment" is the environment or atmosphere to which the olefin polymer material is exposed during the preparation of the graft copolymer and means an environment in which the active oxygen concentration, i.e., the concentration of oxygen in a form that will react with the free radicals in the polymer material, is less than 15%, preferably less than 5%, and most preferably less than 1% by volume. The most preferred concentration of active oxygen is 0.004% or lower by volume. Within these limits, the non-oxidizing atmosphere can be any gas, or mixture of gases, that is oxidatively inert toward the free radicals in the propylene polymer material, e.g., nitrogen, argon, helium, and carbon dioxide.

The propylene polymer material that is used as the backbone of the graft copolymer can be:

(a) a crystalline homopolymer of propylene having an isotactic index greater than 80, preferably about 85 to about 99;

(b) a crystalline copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is 20%, preferably about 16%, by weight, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:

(i) about 10% to about 60% by weight, preferably about 15% to about 55%, of a crystalline propylene homopolymer having an isotactic index greater than 80, preferably about 85 to about 98, or a crystalline copolymer of monomers selected from the group consisting of (a) propylene and ethylene, (b)

propylene, ethylene and a 4–8 C alpha-olefin, and (c) propylene and a 4–8 C alpha-olefin, the copolymer having a polymerized propylene content of more than 85% by weight, preferably about 90% to about 99%, and an isotactic index greater than 85;

(ii) about 5% to about 25%, preferably about 5% to about 20%, of a copolymer of ethylene and propylene or a 4–8 C alpha-olefin that is insoluble in xylene at ambient temperature, and (iii) about 30% to about 70%, preferably about 20% to about 65%, of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight, preferably about 10% to about 60%, most preferably about 12% to about 55%, of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:

(i) about 10% to about 60%, preferably about 20% to about 50%, of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;

(ii) about 20% to about 60%, preferably about 30% to about 50%, of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and (iii) about 3% to about 40%, preferably about 10% to about 20%, of a copolymer of ethylene and propylene or a 4–8 C alpha-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is 25° C.

4–8 C Alpha-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene; propylene and ethylene; propylene and an alpha-olefin, or propylene, ethylene and an alpha-olefin are polymerized to form component (i) of (d) or (e), and in the following stages the mixtures of ethylene and propylene; ethylene and the alpha-olefin, or ethylene, propylene and the alpha-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which are incorporated herein by reference. The preparation of propylene polymer material (e) is described in more detail in U.S. Pat. Nos. 5,302,454 and 5,409,992, which are incorporated herein by reference.

Propylene homopolymer is the preferred propylene polymer backbone material.

The graft copolymer is made by forming active grafting sites on the propylene polymer material by treatment with a peroxide or other chemical compound that is a free radical polymerization initiator. The free radicals produced in the polymer as a result of the chemical treatment form active grafting sites on the polymer and initiate the polymerization of the monomers at these sites.

The polymerization initiator is one that has a decomposition half-life at the temperature employed of about 1 to about 240, preferably about 5 to about 100, and most preferably about 10 to about 40, minutes. Organic peroxides, and especially those that generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butyl peroxyisopropyl-benzene); peroxy esters, such as tert-butylperoxy pivalate, tert-butyl perbenzoate, tert-butyl per-octoate; 2,5-dimethylhexyl 2,5-di(perbenzoate), tert-butyl di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. Peroxy esters are preferred.

The grafting monomers useful in accordance with this invention can be any monomeric vinyl compound capable of being polymerized by free radicals where the vinyl radical $H_2C=CR-$, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acids and their derivatives, including acrylonitrile; methacrylonitrile; acrylamide; methacrylamide, and acrylic acid; acrylate esters, such as the methyl, ethyl, hydroxyethyl, 2-ethylhexyl, and butyl acrylate esters; methacrylic acid; ethacrylic acid, and methacrylate esters such as the methyl, ethyl, butyl, benzyl, phenylethyl, phenoxyethyl, epoxypropyl, and hydroxypropyl methacrylate esters, and maleic anhydride. One or more of these monomers can be used.

The amount of grafting monomer used is about 2 to about 240 parts, preferably about 5 parts to about 100 parts, per hundred parts of propylene polymer material.

During the graft polymerization, the monomers also polymerize to form a certain amount of free or ungrafted polymer or copolymer. The morphology of the graft copolymer is such that the propylene polymer material is the continuous or matrix phase, and the polymerized monomers, both grafted and ungrafted, are a dispersed phase.

Preparation of graft copolymers by contacting a propylene polymer with a free radical polymerization initiator such as an organic peroxide and a vinyl monomer is described in more detail in U.S. Pat. No. 5,140,074, which is incorporated herein by reference.

The polymerizable chain transfer agent that is used to control the molecular weight of the graft copolymer is polymerizable by a free radical mechanism and is a derivative of allyl alcohol, i.e., an ether or ester. The ether allyl propoxylate is preferred. Other suitable derivatives of allyl alcohol include, for example, allyl acetate and allyl butyrate. The chain transfer agent copolymerizes with the grafting monomer(s) and is incorporated into the graft copolymer chain. The chain transfer agent is present in an amount of about 0.5 to about 5%, preferably about 0.5% to about 2%, based on the total weight of monomer.

Addition of the polymerizable chain transfer agent in a graft copolymerization system provides a tool to control the graft copolymer molecular weight and molecular weight distribution. The polymerizable chain transfer agent makes it possible to prepare graft copolymers with a desired molecular weight at a lower reaction temperature, which frequently results in reduced reactor fouling. The molecular weight can be controlled by adjusting the reaction temperature, the monomer to initiator ratio, and the chain transfer agent concentration. A lower grafting efficiency was observed when the chain transfer agent was added. No odor from the chain transfer agent was detected during and after polymerization.

The last step of the process for reducing the molecular weight of graft copolymers is removing any unreacted grafting monomer from the resulting grafted propylene polymer material, decomposing any unreacted initiator, and deactivating any residual free radicals in the material.

Isotactic index is defined as the per cent of olefin polymer insoluble in xylene. The weight percent of olefin polymer soluble in xylene at room temperature is determined by dissolving 2.5 g of the polymer in 250 ml of xylene in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity was measured in decahydronaphthalene at 135° C.

Molecular weight was determined by gel permeation chromatography.

The porosity of the propylene homopolymer used as the backbone polymer in the manufacture of the graft copolymers in the examples was measured as described in Winslow, N. M. and Shapiro, J. J., "An Instrument for the Measurement of Pore Size Distribution by Mercury Penetration," ASTM Bull., TP 49, 39–44 (February 1959), and Rootare, H. M., Ed., *Advanced Experimental Techniques in Powder Metallurgy*, Plenum Press, New York, 1970.

Bulk density is determined using ASTM D-1895.

In this specification, all parts and percentages are by weight unless otherwise noted.

Example 1

In this and the following example the propylene homopolymer used as the backbone polymer for the graft copolymer had a porosity of 0.51 cm$^3$/g and a bulk density of 0.37 g/cm$^3$, and is commercially available from Basell USA Inc.

The graft copolymer was prepared as follows. The methyl methacrylate, methyl acrylate, initiator, and the amount of AP-1375 chain transfer agent (CTA) shown in Table 1 were premixed and fed into a 2 gallon semi-batch reactor containing the propylene homopolymer at a feed rate of 1.0 pph/min. The monomer to initiator ratio (M/I) and the grafting temperature are shown in Table 1. Ninety-five parts by weight of monomers (90.9 parts methyl methacrylate and 4.1 parts methyl acrylate) were added per 100 parts of propylene homopolymer. Lupersol 11, t-butylperoxy pivalate, commercially available from Atofina, was used as the polymerization initiator. The AP-1375 chain transfer agent was allyl propoxylate, commercially available from Lyondell Chemical Worldwide, Inc. After addition of monomers was complete, the reaction temperature was maintained for 30 minutes. The temperature was then raised to 140° C. for 90 minutes under a nitrogen purge.

TABLE 1

| Sample No. | Reaction Temperature (° C.) | M/I Ratio (molar) | CTA (wt. %) |
|---|---|---|---|
| 1 | 105 | 120 | 4.24 |
| 2 | 105 | 60 | 0 |
| 3 | 85 | 60 | 0 |
| 4 | 85 | 120 | 4.24 |
| 5 | 85 | 120 | 0 |
| 6 | 105 | 60 | 4.24 |
| 7 | 95 | 90 | 2.12 |
| 8 | 85 | 60 | 4.24 |
| 9 | 105 | 120 | 0 |
| 10 | 95 | 90 | 2.12 |
| 11 | 95 | 90 | 2.12 |

The graft copolymers were analyzed for total add level of poly(methyl methacrylate) (PMMA) under various reaction conditions by Fourier transform infrared spectroscopy (FTIR) using a BioRad FSS-7 analyzer. The add level of PMMA per hundred parts of propylene homopolymer (pph), the reaction temperature, the M/I ratio, and the wt. % CTA added are given in Table 2. Statistical analysis showed that the variables and their interactions were not statistically significant for the polymerization conversion. The polymerization conversion was high under all the conditions investigated, although the polymerization rate was different.

TABLE 2

| Sample No. | Grafting Temperature (° C.) | M/I Ratio (molar) | CTA (wt. %) | PMMA (pph) |
|---|---|---|---|---|
| 1 | 105 | 120 | 4.24 | 87.7 |
| 2 | 105 | 60 | 0 | 88.5 |
| 3 | 85 | 60 | 0 | 83.7 |
| 4 | 85 | 120 | 4.24 | 87.7 |
| 5 | 85 | 120 | 0 | 86.8 |
| 6 | 105 | 60 | 4.24 | 88.6 |
| 7 | 95 | 90 | 2.12 | 89.2 |
| 8 | 85 | 60 | 4.24 | 91.8 |
| 9 | 105 | 120 | 0 | 90.9 |
| 10 | 95 | 90 | 2.12 | 87.7 |
| 11 | 95 | 90 | 2.12 | 84.8 |

The influence of the reaction conditions on the molecular weight of the graft copolymers is shown in Table 3. Statistical analysis showed that all three factors, reaction temperature, monomer/initiator ratio and chain transfer agent concentration, had a significant influence on the polymer molecular weights.

TABLE 3

| Sample No. | Grafting Temperature (° C.) | M/I Ratio (molar) | CTA (wt/%) | Mw ($10^3$) | Mn ($10^3$) |
|---|---|---|---|---|---|
| 1 | 105 | 120 | 4.24 | 159 | 56 |
| 2 | 105 | 60 | 0 | 180 | 64 |
| 3 | 85 | 60 | 0 | 365 | 97 |
| 4 | 85 | 120 | 4.24 | 306 | 87 |
| 5 | 85 | 120 | 0 | 495 | 129 |
| 6 | 105 | 60 | 4.24 | 126 | 43 |
| 7 | 95 | 90 | 2.12 | 226 | 82 |
| 8 | 85 | 60 | 4.24 | 267 | 75 |
| 9 | 105 | 120 | 0 | 217 | 72 |
| 10 | 95 | 90 | 2.12 | 227 | 73 |
| 11 | 95 | 90 | 2.12 | 235 | 73 |

The molecular weight of the graft copolymers is a stronger function of the reaction temperature and CTA concentration than of the initiator concentration. The molecular weight decreased as the reaction temperature or the CTA concentration increased.

The molecular weight distribution (MWD) of the graft copolymers under various conditions is shown in Table 4. Statistical analysis indicated that only the reaction temperature had a significant impact on MWD. The MWD was narrower with an increase in grafting temperature.

TABLE 4

| Sample No. | Grafting Temperature (° C.) | M/I Ratio (molar) | CTA (wt. %) | MWD |
|---|---|---|---|---|
| 1 | 105 | 120 | 4.24 | 2.84 |
| 2 | 105 | 60 | 0 | 2.81 |
| 3 | 85 | 60 | 0 | 3.76 |
| 4 | 85 | 120 | 4.24 | 3.52 |
| 5 | 85 | 120 | 0 | 3.84 |
| 6 | 105 | 60 | 4.24 | 2.93 |
| 7 | 95 | 90 | 2.12 | 2.76 |
| 8 | 85 | 60 | 4.24 | 3.56 |
| 9 | 105 | 120 | 0 | 3.01 |
| 10 | 95 | 90 | 2.12 | 3.11 |
| 11 | 95 | 90 | 2.12 | 3.22 |

Example 2

The graft copolymer was prepared in the presence of a polymerizable chain transfer agent as described in Example 1, except that Lupersol PMS (50% t-butyl peroxy-2-ethyl hexanoate in odorless mineral spirits), commercially available from Atofina, was used as the peroxide initiator and the chain transfer agent was ARCAL AP 1.6, allyl propoxylate, commercially available from Lyondell Chemical Worldwide, Inc. Since the grafting temperature was higher than in Example 1, a more thermally stable peroxide initiator was used.

The grafting temperature, M/I ratio, and the amount of CTA for each sample are shown in Table 1.

TABLE 1

| Sample No. | Grafting Temperature (° C.) | M/I Ratio (molar) | CTA (wt. %) |
|---|---|---|---|
| 1 | 130 | 140 | 4.24 |
| 2 | 130 | 100 | 0 |
| 3 | 100 | 100 | 0 |
| 4 | 100 | 140 | 4.24 |
| 5 | 100 | 140 | 0 |
| 6 | 130 | 100 | 4.24 |
| 7 | 115 | 120 | 2.12 |
| 8 | 100 | 100 | 4.24 |
| 9 | 130 | 140 | 0 |
| 10 | 115 | 120 | 2.12 |
| 11 | 115 | 120 | 2.12 |

Table 2 shows the PMMA add levels analyzed by FTIR under various reaction conditions. The variables and interactions were not statistically significant for the polymerization conversion. Polymerization conversion was high under all the conditions investigated, although the polymerization rate was different.

TABLE 2

| Sample No. | Grafting Temperature (° C.) | M/I Ratio (molar) | CTA (wt. %) | PMMA (pph) |
|---|---|---|---|---|
| 1 | 130 | 140 | 4.24 | 89.3 |
| 2 | 130 | 100 | 0 | 91.1 |
| 3 | 100 | 100 | 0 | 95.0 |
| 4 | 100 | 140 | 4.24 | 95.5 |
| 5 | 100 | 140 | 0 | 92.7 |
| 6 | 130 | 100 | 4.24 | 90.2 |
| 7 | 115 | 120 | 2.12 | 92.8 |
| 8 | 100 | 100 | 4.24 | 95.4 |
| 9 | 130 | 140 | 0 | 91.0 |
| 10 | 115 | 120 | 2.12 | 95.1 |
| 11 | 115 | 120 | 2.12 | 96.6 |

The influence of the reaction conditions on the molecular weight of the graft copolymers is shown in Table 3. Statistical analysis showed that the reaction temperature had the most significant influence on the molecular weight, followed by the chain transfer agent concentration.

TABLE 3

| Sample No. | Grafting Temperature (° C.) | M/I Ratio (molar) | CTA (wt. %) | Mw ($10^3$) | Mn ($10^3$) |
|---|---|---|---|---|---|
| 1 | 130 | 140 | 4.24 | 69 | 26 |
| 2 | 130 | 100 | 0 | 64 | 25 |
| 3 | 100 | 100 | 0 | 250 | 63 |
| 4 | 100 | 140 | 4.24 | 196 | 53 |
| 5 | 100 | 140 | 0 | 271 | 74 |
| 6 | 130 | 100 | 4.24 | 59 | 23 |
| 7 | 115 | 120 | 2.12 | 107 | 32 |
| 8 | 100 | 100 | 4.24 | 178 | 51 |

TABLE 3-continued

| Sample No. | Grafting Temperature (° C.) | M/I Ratio (molar) | CTA (wt. %) | Mw (10³) | Mn (10³) |
|---|---|---|---|---|---|
| 9 | 130 | 140 | 0 | 73 | 29 |
| 10 | 115 | 120 | 2.12 | 112 | 37 |
| 11 | 115 | 120 | 2.12 | 113 | 37 |

The molecular weight distribution (MWD) of the graft copolymers is shown in Table 4. The results of the statistical analysis indicated that only reaction temperature has a significant impact on MWD. The molecular weight distribution is narrower with an increase in the reaction temperature.

TABLE 4

| Sample No. | Grafting Temperature (° C.) | M/I Ratio (molar) | CTA (wt. %) | MWD |
|---|---|---|---|---|
| 1 | 130 | 140 | 4.24 | 2.65 |
| 2 | 130 | 100 | 0 | 2.56 |
| 3 | 100 | 100 | 0 | 3.97 |
| 4 | 100 | 140 | 4.24 | 3.70 |
| 5 | 100 | 140 | 0 | 3.66 |
| 6 | 130 | 100 | 4.24 | 2.57 |
| 7 | 115 | 120 | 2.12 | 3.34 |
| 8 | 100 | 100 | 4.24 | 3.49 |
| 9 | 130 | 140 | 0 | 2.52 |
| 10 | 115 | 120 | 2.12 | 3.03 |
| 11 | 115 | 120 | 2.12 | 3.05 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A process for reducing the molecular weight of graft copolymers comprising, in a substantially non-oxidizing atmosphere, (a) treating a propylene polymer material with an organic compound that is a free radical polymerization initiator, (b) treating the propylene polymer material over a period of time that coincides with or follows (a) with or without overlap, with about 2 to about 240 parts per hundred parts of the propylene polymer material, of at least one vinyl-substituted grafting monomer capable of being polymerized by free radicals, in the presence of about 0.5% to about 5% by weight, based on the total weight of monomer, of a polymerizable chain transfer agent that is an ether or ester of allyl alcohol, and (c) removing any unreacted monomer from the resulting grafted propylene polymer material, decomposing any unreacted initiator, and deactivating any residual free radicals in the material.

2. The process of claim 1 wherein the propylene polymer material is selected from the group consisting of:

(a) a crystalline homopolymer of propylene having an isotactic index greater than 80;

(b) a crystalline copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is 20%, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:

(i) about 10% to about 60% by weight of a crystalline propylene homopolymer having an isotactic index greater than 80, or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight, and an isotactic index greater than 85;

(ii) about 5% to about 25% of a copolymer of ethylene and propylene or a 4–8 C alpha-olefin that is insoluble in xylene at ambient temperature, and (iii) about 30% to about 70% of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; or (e) a thermoplastic olefin comprising:

(i) about 10% to about 60% of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;

(ii) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and (iii) about 3% to about 40% of a copolymer of ethylene and propylene or a 4–8 C alpha-olefin that is insoluble in xylene at ambient temperature, wherein the composition has a flexural modulus of greater than 150 but less than 1200 MPa.

3. The process of claim 2 wherein the propylene polymer material is a propylene homopolymer.

4. The process of claim 1 wherein the polymerizable chain transfer agent is an ether of allyl alcohol.

5. The process of claim 4 wherein the ether is allyl propoxylate.

6. The process of claim 1 wherein the grafting monomers are methyl methacrylate and methyl acrylate.

7. A composition comprising
   (a) a propylene polymer material containing active grafting sites,
   (b) about 2 to about 240 parts per hundred parts of the propylene polymer material of at least one vinyl-substituted grafting monomer, and
   (c) about 0.5% to about 5%, based on the total weight of monomer, of a polymerizable chain transfer agent that is an ether or ester of allyl alcohol.

8. The composition of claim 7 wherein the propylene polymer material is selected from the group consisting of:
   (a) a crystalline homopolymer of propylene having an isotactic index greater than 80;
   (b) a crystalline copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is 20%, the copolymer having an isotactic index greater than 85;
   (c) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
   (d) an olefin polymer composition comprising:
      (i) about 10% to about 60% by weight of a crystalline propylene homopolymer having an isotactic index greater than 80, or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight, and an isotactic index greater than 85;
      (ii) about 5% to about 25% of a copolymer of ethylene and propylene or a 4–8 C alpha-olefin that is insoluble in xylene at ambient temperature, and
      (iii) about 30% to about 70% of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight of polymerized ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages, and has a flexural modulus of less than 150 MPa; or (e) a thermoplastic olefin comprising:
      (i) about 10% to about 60% of a crystalline propylene homopolymer having an isotactic index greater than 80, or a crystalline copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
      (ii) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and
      (iii) about 3% to about 40% of a copolymer of ethylene and propylene or a 4–8 C alpha-olefin that is insoluble in xylene at ambient temperature, wherein the composition has a flexural modulus of greater than 150 but less than 1200 MPa.

9. The composition of claim 8 wherein the propylene polymer material is a propylene homopolymer.

10. The composition of claim 7 wherein the polymerizable chain transfer agent is an ether of allyl alcohol.

11. The composition of claim 10 wherein the ether is allyl propoxylate.

12. The composition of claim 7 wherein the grafting monomers are methyl methacrylate and methyl acrylate.

* * * * *